United States Patent
Jesse, Sr. et al.

[11] Patent Number: 6,024,055
[45] Date of Patent: Feb. 15, 2000

[54] DOG SWEATER WITH INTEGRAL LEGS

[76] Inventors: Ronald C. Jesse, Sr.; Darlene L. Jesse, both of 1314 Moonlite Dr., Eagle River, Wis. 54521

[21] Appl. No.: 09/088,036

[22] Filed: Jun. 1, 1998

[51] Int. Cl.⁷ .................................................. A01K 13/00
[52] U.S. Cl. .............................. 119/850; 54/79.1; 54/79.4
[58] Field of Search ................................. 119/850, 854, 119/671, 678; 54/79.1, 79.2, 79.3, 79.4

[56] References Cited

U.S. PATENT DOCUMENTS

| | | | |
|---|---|---|---|
| 1,595,834 | 8/1926 | Griffiths | 54/79.1 |
| 2,222,705 | 11/1940 | Conlon | 54/79.1 |
| 2,443,831 | 6/1948 | Miller | 54/79.1 |
| 3,742,679 | 7/1973 | Jordan | 54/79.1 |
| 4,355,600 | 10/1982 | Zielinski | 119/850 |
| 4,633,817 | 1/1987 | Taylor | 119/850 |
| 5,359,963 | 11/1994 | Jesse, Jr. et al. | 119/850 |
| 5,447,124 | 9/1995 | Pollock et al. | 119/850 |
| 5,458,094 | 10/1995 | Proshan | 119/850 |
| 5,463,985 | 11/1995 | Shover | 119/850 |

*Primary Examiner*—Michael J. Carone
*Assistant Examiner*—James S. Bergin

[57] ABSTRACT

A dog sweater is provided including a torso portion having a generally tubular configuration, the torso portion having a circular neck opening of a first diameter and a cylindrical neck band with an end coupled about a periphery of the neck opening and extending outwardly therefrom, the torso portion further including a rear opening of a second diameter greater than the first diameter, the torso portion further including four leg apertures; and a plurality of legs, each leg having an open top fixedly coupled to an associated one of the leg apertures, a closed bottom and an intermediate extent.

1 Claim, 3 Drawing Sheets

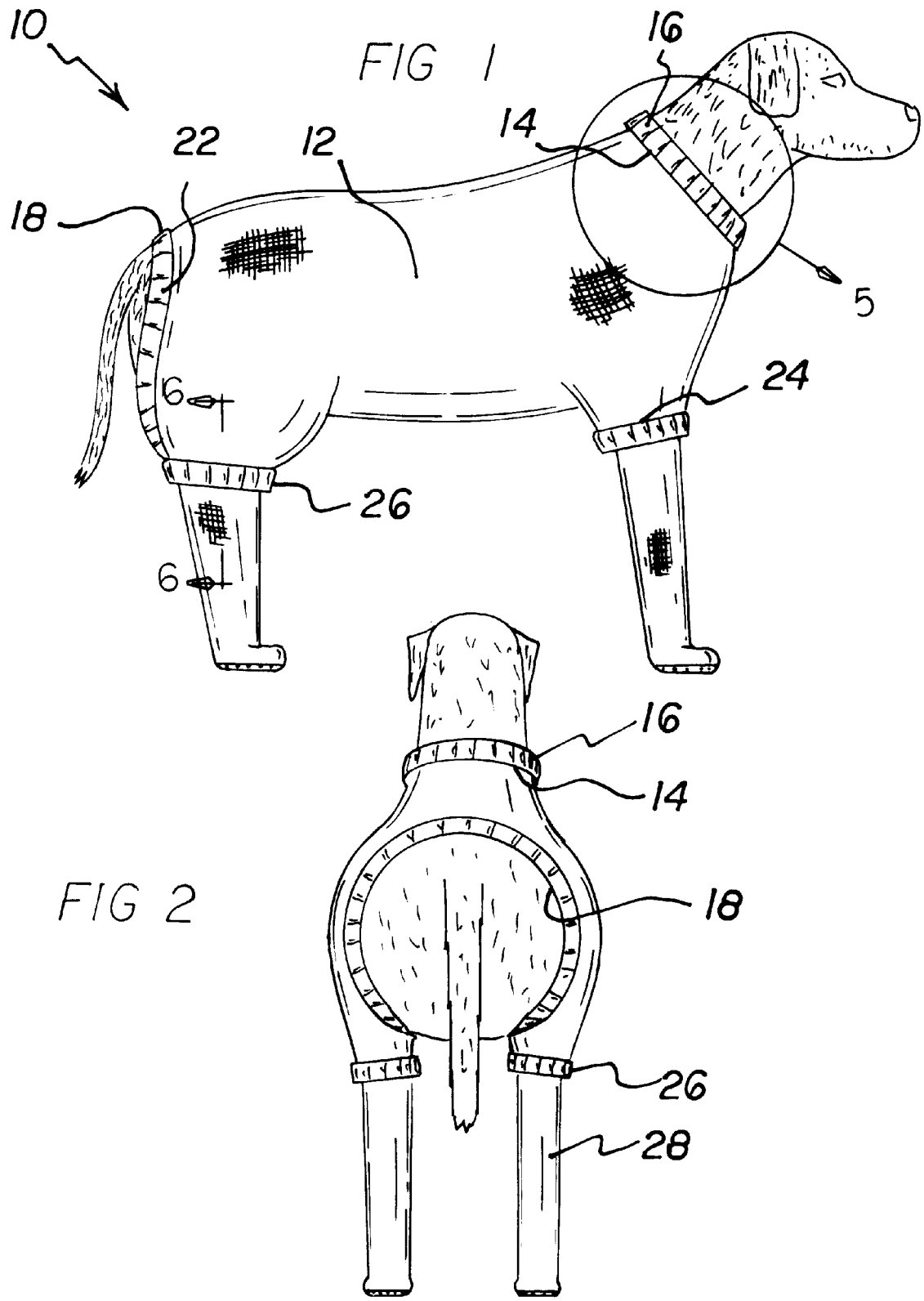

DOG SWEATER WITH INTEGRAL LEGS

BACKGROUND OF THE INVENTION

1. Field of the Invention

The present invention relates to a dog sweater with integral legs and more particularly pertains to protecting a dog from inclement weather.

2. Description of the Prior Art

The use of pet garments is known in the prior art. More specifically, pet garments heretofore devised and utilized for the purpose of clothing animals are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,060,458; U.S. Pat. No. 4,355,600; U.S. Pat. No. 4,527,991; U.S. Pat. No. 5,003,756; and U.S. Pat. No. 5,359,963.

In this respect, the dog sweater with integral legs according to the present invention substantially departs from the conventional concepts and designs of the prior art, and in so doing provides an apparatus primarily developed for the purpose of protecting a dog from inclement weather.

Therefore, it can be appreciated that there exists a continuing need for a new and improved dog sweater with integral legs which can be used for protecting a dog from inclement weather. In this regard, the present invention substantially fulfills this need.

SUMMARY OF THE INVENTION

In view of the foregoing disadvantages inherent in the known types of pet garments now present in the prior art, the present invention provides an improved dog sweater with integral legs. As such, the general purpose of the present invention, which will be described subsequently in greater detail, is to provide a new and improved dog sweater with integral legs which has all the advantages of the prior art and none of the disadvantages.

To attain this, the present invention essentially comprises a torso portion. It should be noted that the torso portion has a generally tubular configuration and is constructed from a knit material formed of threads of a first thickness. Further, the torso portion has a circular neck opening of a first diameter. A cylindrical neck band is provided with an end coupled about a periphery of the neck opening. The neck band extends outwardly from the torso portion for being folded over itself to define a collar. The torso portion further includes a rear opening of a second diameter greater than the first diameter. The rear opening includes a U-shaped cut out formed in a lower portion thereof in communication with the rear opening. The U-shaped cut out extends along a lower portion of the torso portion for about ⅙ a length thereof, as shown in FIG. 3. Further, the U-shaped cut out and rear opening share a common peripheral edge which is lined with a band. FIG. 3 show that the torso portion further includes four leg apertures formed in the lower portion thereof. Such apertures include a pair of front leg apertures and a pair of rear apertures which flank the U-shaped cut out. As shown in FIG. 6, each of the apertures has a peripheral edge which is lined with a cylindrically shaped leg band which extends downwardly therefrom for reasons that will become apparent hereinafter. Next provided is a plurality of tubular legs each constructed from a knit material formed from threads of a second thickness less than the first thickness. Each leg has an open top stitchedly coupled to an associated one of the leg apertures such that the leg band freely encompasses an outer surface of the leg. Each leg is also equipped with a closed bottom and an intermediate extent with a constant diameter. Note FIGS. 1 & 2. Finally, a plurality of foot pads each are formed of a planar generally rectangular piece of fabric stitchedly coupled to an outer surface of the closed bottom of each of the legs. Each piece of fabric further includes a matrix of dome shaped elastomeric pads formed thereon for gripping purposes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog sweater with integral legs which has all the advantages of the prior art pet garments and none of the disadvantages.

It is another object of the present invention to provide a new and improved dog sweater with integral legs which may be easily and efficiently manufactured and marketed.

It is a further object of the present invention to provide a new and improved dog sweater with integral legs which is of a durable and reliable construction.

An even further object of the present invention is to provide a new and improved dog sweater with integral legs which is susceptible of a low cost of manufacture with regard to both materials and labor, and which accordingly is then susceptible of low prices of sale to the consuming public, thereby making such dog sweater with integral legs economically available to the buying public.

Still yet another object of the present invention is to provide a new and improved dog sweater with integral legs which provides in the apparatuses and methods of the prior art some of the advantages thereof, while simultaneously overcoming some of the disadvantages normally associated therewith.

Still another object of the present invention is to protecting a dog from inclement weather.

Lastly, it is an object of the present invention to provide a new and improved dog sweater including a torso portion having a generally tubular configuration, the torso portion having a circular neck opening of a first diameter and a cylindrical neck band with an end coupled about a periphery of the neck opening and extending outwardly therefrom, the torso portion further including a rear opening of a second diameter greater than the first diameter, the torso portion further including four leg apertures; and a plurality of legs, each leg having an open top fixedly coupled to an associated one of the leg apertures, a closed bottom and an intermediate extent.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side illustration of the preferred embodiment of the dog sweater with integral legs constructed in accordance with the principles of the present invention.

FIG. 2 is a rear view of the present invention.

Similar reference characters refer to similar parts throughout the several views of the drawings.

DESCRIPTION OF THE PREFERRED EMBODIMENT

Figure 3:
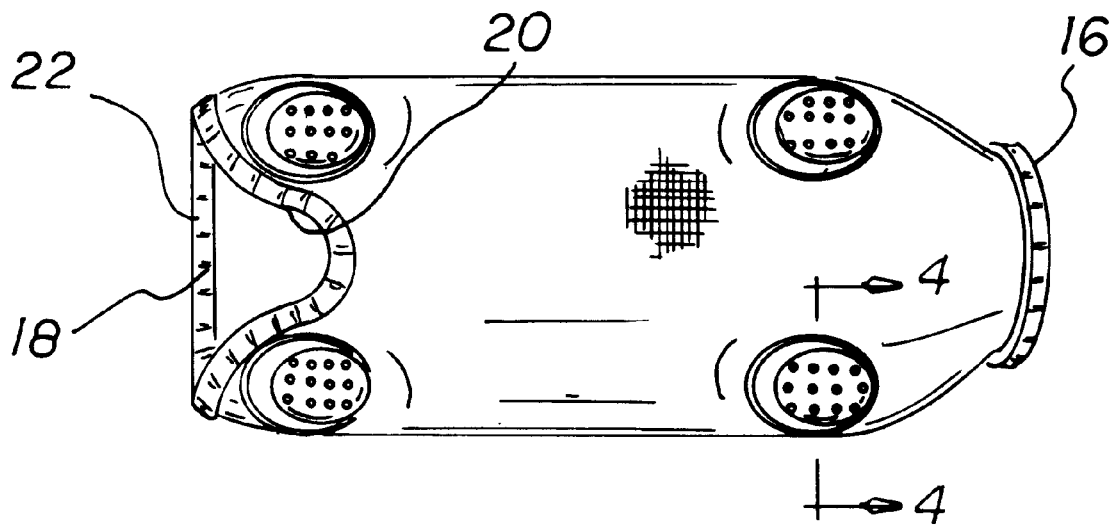
FIG. 3 is a bottom view of the present invention.

With reference now to the drawings, and in particular to FIG. 1 thereof, a new and improved dog sweater with integral legs embodying the principles and concepts of the present invention and generally designated by the reference numeral 10 will be described.

The present invention, the new and improved dog sweater with integral legs, is comprised of a plurality of components. Such components in their broadest context include a torso, legs and foot pads. Such components are individually configured and correlated with respect to each other so as to attain the desired objective.

Figure 5:
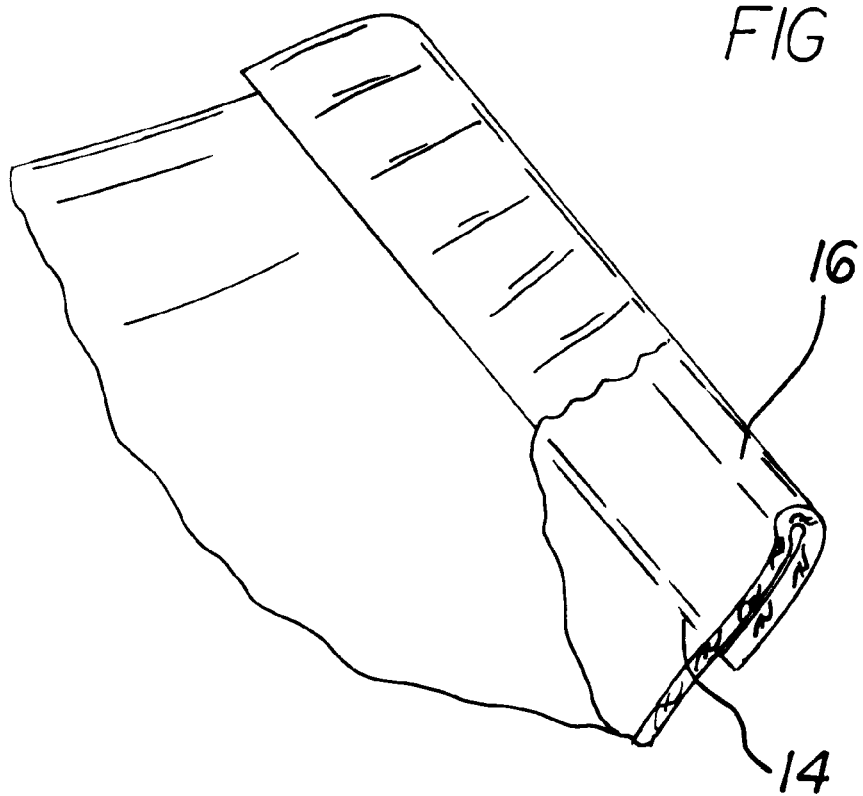
FIG. 5 is a side view of the collar of the present invention.

More specifically, it will be noted that the system 10 of the present invention includes a torso portion 12. It should be noted that the torso portion has a generally tubular configuration and is constructed from a knit material formed of threads of a first thickness. Further, the torso portion has a circular neck opening 14 of a first diameter. A cylindrical neck band 16 is provided with an end coupled about a periphery of the neck opening. The neck band extends outwardly from the torso portion for being folded over itself to define a collar. Note FIG. 5.

The torso portion further includes a rear opening 18 of a second diameter greater than the first diameter. The rear opening includes a U-shaped cut out 20 formed in a lower portion thereof in communication with the rear opening. The U-shaped cut out extends along a lower portion of the torso portion for about ⅙ a length thereof, as shown in FIG. 3. Further, the U-shaped cut out and rear opening share a common peripheral edge which is lined with a band 22.

Figure 6:
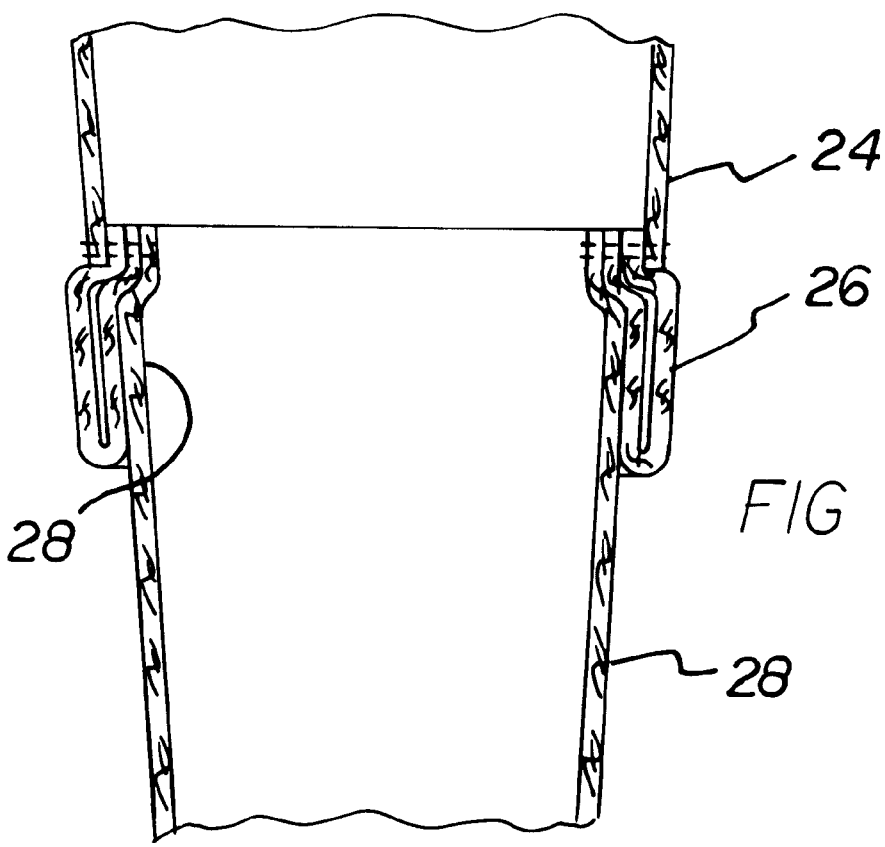
FIG. 6 is a side cross-sectional view of the present invention taken along line 6—6 shown in FIG. 1.

FIGS. 3 show that the torso portion further includes four leg apertures 24 formed in the lower portion thereof. Such apertures include a pair of front leg apertures and a pair of rear apertures which flank the U-shaped cut out. As shown in FIG. 6, each of the apertures includes a peripheral edge which has a cylindrically shaped leg band 26 stitchedly coupled thereto. Each leg band extends downwardly from the corresponding leg aperture for reasons that will become apparent hereinafter. As shown in FIG. 6, each leg band is folded over to afford a double layer.

Figure 4:
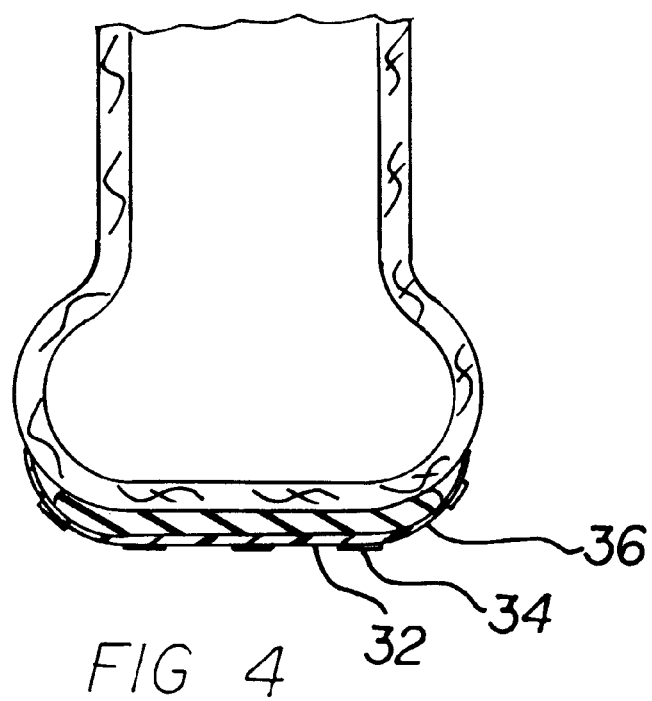
FIG. 4 is a side cross-sectional view of the present invention taken along line 4—4 shown in FIG. 3.

Next provided is a plurality of tubular legs 28 each constructed from a knit material formed from threads of a second thickness less than the first thickness. By this structure, the torso is adapted to provide greater warmth while the legs serve to afford greater flexibility. Each leg has an open top stitchedly coupled to an associated one of the leg apertures such that the leg band freely encompasses an outer surface of the leg. Each leg is also equipped with a closed bottom and an intermediate extent with a constat diameter. Note FIGS. 1 & 2. As an option, the closed bottom may be bulbous in form, as shown in FIG. 4.

Finally, a plurality of foot pads 30 each are formed of a planar generally rectangular piece of heavy-duty, sturdy fabric 32 stitchedly coupled to an outer surface of the closed bottom of each of the legs for use of the present invention in snow. Each piece of fabric further includes a matrix of dome shaped elastomeric pads 34 formed thereon for gripping purposes. As an option, an elastomeric pad may be situated between the fabric 32 and the closed bottom of the corresponding leg.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog sweater comprising, in combination:

a torso portion having a generally tubular configuration and constructed from a knit material formed of threads of a first thickness, the torso portion having a circular neck opening of a first diameter and a cylindrical neck band with an end coupled about a periphery of the neck opening and extending outwardly therefrom for being folded over itself to define a collar, the torso portion further including a rear opening of a second diameter greater than the first diameter and including a U-shaped cut out formed in a lower portion thereof in communication with the rear opening, the U-shaped cut out extending along a lower portion of the torso portion for about ⅙ a length thereof, the U-shaped cut out and rear opening having a common peripheral edge which is lined with a band, the torso portion further including four leg apertures formed in the lower portion thereof including a pair of front leg apertures and a pair of rear apertures which flank the U-shaped cut out, wherein each of the apertures has a peripheral edge which is lined with a cylindrically shaped leg band which extends downwardly therefrom, each leg band being folded over to form a double layer with free edges at their upper extents and within the lea apertures;

a plurality of tubular legs each constructed from a knit material formed from threads of a second thickness less than the first thickness, each leg having an open top within an associated leg band and with permanent stitching through each leg aperture and leg band and leg such that the leg band freely encompasses an outer surface of the leg, a closed bottom and an intermediate extent with a constant diameter formed therebetween; and a plurality of foot pads each including planar generally rectangular piece of fabric stitchedly coupled to an outer surface of the closed bottom of each of the legs, each piece of fabric further including a plurality of dome shaped elastomeric pads formed thereon for gripping purposes.

\* \* \* \* \*